DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 30, 1969

869 O.G. 1385

T869,018

INSECTICIDES AND SYNERGISTS

Ronald Eugene Montgomery, 46 S. Vernon St., Middleport, N.Y. 14105, and Harry Hobart Incho, 137 Ensign Ave., Medina, N.Y. 14103

Filed Feb. 18, 1969, Ser. No. 800,249

Int. Cl. A01n *9/36;* C07f *9/40*

U.S. Cl. 424—219

No Drawing. 14 Pages Specification

Synergistic insecticidal combinations of esters of chrysanthemumic acid, e.g. allethrin, pyrethrins, and (1-cyclohexene-1,2-dicarboximido)methyl chrysanthemumate, with certain di-ω-alkynyl arylvinylphosphonates as synergists, are described. The preparation and physical properties of representative members of this new class of phosphonates are described, and the insecticidal properties of their synergistic combinations with representative chrysanthemumates are reported.